Sept. 28, 1965     F. J. FEAGIN ETAL     3,209,134
INTERPRETATION OF GEOPHYSICAL DATA Filed Dec. 1, 1958     2 Sheets-Sheet 1

INVENTORS.
FRANK J. FEAGIN,
MALCOLM R. MacPHAIL,
BY WILLIAM M. RUST, JR.,

John B. Davidson
ATTORNEY.

Sept. 28, 1965  F. J. FEAGIN ETAL  3,209,134
INTERPRETATION OF GEOPHYSICAL DATA
Filed Dec. 1, 1958  2 Sheets-Sheet 2

INVENTORS.
FRANK J. FEAGIN,
MALCOLM R. MacPHAIL,
BY  WILLIAM M. RUST, JR.,

ATTORNEY.

United States Patent Office 3,209,134
Patented Sept. 28, 1965

3,209,134
INTERPRETATION OF GEOPHYSICAL DATA
Frank J. Feagin, Malcolm R. MacPhail, and William M. Rust, Jr., Houston, Tex., assignors, by mesne assignments, to Esso Production Research Company, Houston, Tex., a corporation of Delaware
Filed Dec. 1, 1958, Ser. No. 777,332
9 Claims. (Cl. 235—181)

This is a continuation-in-part of co-pending application Serial No. 382,588, filed September 28, 1953, now U.S. Patent No. 2,927,656.

This invention relates to geophysical prospecting and to a method and apparatus for obtaining objective interpretations, based on rationally established criteria, of complex geophysical data containing both useful and irrelevant information.

Geophysical prospecting is concerned primarily with the problem of locating and determining the nature of geologic structures which are buried far below the surface of the earth. There are a number of geophysical prospecting methods each concerned with the measurement of a particular physical property of the earth and the interpretation of said measurements. Since the problem is to locate geological structures, it is necessary to carry out the measurements at points distributed over wide areas of the earth's surface. The information obtained at each of these observation points must then be compared or correlated with the information from the other points before an over-all interpretation of the data can be made. In general, the geophysical information obtained during prospecting operations is of enormous complexity and contains a large proportion of extraneous, or noise, components which make the interpretation of such data a formidable task. In many instances it is virtually impossible to separate the useful from the extraneous components of the data and it frequently occurs that two or more equally skilled interpreters arrive at different conclusions regarding the meaning of the data. It is apparent, therefore, that a need exists for more refined methods of geophysical interpretation.

Where geophysical investigations are conducted by means of instruments lowered into holes drilled in the earth, as in electrical logging, radioactivity logging, dipmeter logging, and the like, it is necessary to compare the well logs obtained in a number of holes in a particular area so as to obtain an indication of the depths of a particular geological formation at the various borehole sites. The practice has been to examine the well logs visually in an effort to associate a characteristic variation or "kick" in the measured quantity with a particular geologic formation. If such a correlation can be made using the logs obtained in wells distributed over an area, it is possible, of course, to map the subsurface structure with reasonable accuracy. In many cases, however, the appearance of the same formation on well logs from scattered wells will vary widely as a result of certain changes in the formation itself and it requires great skill to properly interpret the logs and to correlate formations from well to well.

In the case of wildcat wells it is very desirable to obtain information about the subsurface structures but there being no other wells in the vicinity it is not possible to compile the data from a number of separate well logs. To meet this problem special well logging devices known as dipmeters have been developed which are intended to provide structural information about the subsurface from the single borehole. These devices operate by locating the interface between two particular formations at several points around the periphery of the borehole. If the interface is shown to intersect the borehole wall a fraction of an inch higher on one side of the hole than on the other, this may be interpreted as meaning that the subsurface formations lie at an angle with respect to the horizontal. In practice, at least three indications of the interface are obtained around the sides of the borehole and from the positions of these three points the plane marking the interface between the particular two formations is calculated. Here again, the problem concerns the separation of extraneous indications from those which are significant. For example, in the caliper type dipmeter, three arms extend outwardly from the instrument and bear against the wall of the borehole. The amount of extension of each arm is recorded continuously at the surface thereby drawing a miniature profile of the borehole wall at three azimuths. The interface between a relatively hard and a soft formation is indicated by a point where the profile suddenly changes from normal or bit size to a relatively greater diameter. Actually, the wall of a borehole is quite irregular, not only because of variations in hardness but also because of many random effects which occur during the drilling operation. Here again, is a situation where the useful information is clouded and confused by a large amount of "noise" which can contribute nothing to the determination of the dip of the formations. It has been found necessary, therefore, to consider not individual interfaces or washouts on the caliper type dipmeter records but, instead, to consider 30 to 50 foot sections of the logs and to attempt to find the displacement of the three profiles with respect to each other which results in the best fit or the highest correlation. In holes which have many irregular washes and in which strong contrasts in hardness do not occur, the interpretation of dipmeter logs is exceedingly difficult and different human computers may easily arrive at different conclusions as to the actual subsurface conditions.

Seismic prospecting, as practiced today, consists essentially of the steps of initiating a disturbance at a known point in the earth's crust and recording the resulting earth motion at a number of spaced detector stations. These recordings usually take the form of a plurality of galvanometer traces positioned side by side on a strip of photographic paper. These recordings are examined visually, and if particular seismic events on the recording can be identified as reflections from subsurface beds and if the seismic velocity of the subsurface material is known, it becomes a relatively straightforward problem in geometry to calculate the depth of the reflecting interface and its angle of dip. Most of the problems associated with seismic prospecting are not related to the calculations but are concerned with the identification on the seismogram of those seismic events to which the computations may be applied. Unfortunately, the firing of an explosive charge in a borehole does not produce a simple motion of the earth's crust. On the contrary, the resulting seismic disturbance is a thing of great complexity. Energy is radiated in all directions thus wasting, from the geophysicist's standpoint, all the energy put into the ground except for the minute amount which travels downward in a particular direction. Also, the explosion creates different types of wave motion which behave differently in travelling through the earth's crust and which travel with different velocities. Some of the energy appears as surface waves which cause relatively large signals at the geophones but which carry no usual information. To further complicate the situation, the medium through which the waves are propagated, the earth, is a body of almost unparalleled complexity with inhomogeneities occurring in all of its physical constants even within a relatively small volume. All of these factors operate to complicate the problem of seismic prospecting so that even in a relatively "good" area a record obtained with a single geophone and recording system would defy interpretation and it would be most difficult, if not impossible, to identify any particular wave on the record as a reflection.

Over the past 20 years the progress of seismic prospecting has been marked by a succession of techniques for separating the received seismic signal into that part yielding useful information which might be termed the message and the residue which has been termed noise. One of the earliest steps taken to accentuate the useful portion of the signal was a separation on a frequency basis. It was found that for any particular area the useful information was contained in a relatively narrow frequency band. Band pass filters were therefore utilized to increase the intelligibility of the record or to improve the message-to-noise ratio. While this techinique of separating message from noise on a frequency basis made the identification of reflected energy easier, it was still a formidabllbe task and other expedients were applied. Instead of using a single geophone to record the earth motion, a number of geophones were laid out, usually along a line extending from the shot point. While any single geophone signal obtained in this way was no more informative than previously, it was found that reflections could be identified with much more certainty, for reflections could be expected to appear on the various traces with a distinct and uniform time delay. Technique utilizing this characteristic amounts to a separation of the message from the noise on a direction-of-arrival basis. Just as a reduction in frequency band width to a point results in an improved message-to-noise ratio, so also a more and more directional receiver, if properly oriented with respect to the path of arrival of the signal may improve the message-to-noise ratio. More recently the utilization of this "directional receiver" technique in seismic prospecting has been extended by the use of large clusters of geophones laid out in such patterns as to accentuate seismic waves, within certain frequency limits, which arrive from a vertical or near vertical direction.

At the present stage of the seismic prospecting are, therefore, the problem of improving the message-to-noise ratio has been attacked by applying two separation processes; one on a frequency basis and one on a direction of arrival basis. These methods have been of material assistance to exploration geophysics, but present techniques still leave much to be desired. In certain areas, using all available methods, records are still obtained on which the most experienced human computers are unable to identify reflections. In a recent paper which appeared in volume XVI, page 450 of Geophysics, a study is presented of the ability of typical computers to identify reflections in the presence of known amounts of noise. Working from synthetic records it was concluded that with conventional multitrace presentation, the number of correctly identified reflections was directly related to the message-to-noise ratio. Below about 0 db message-to-noise, it was found to be impossible to distinguish consistently the reflected events. Unfortunately, many records are still obtained which have message-to-noise ratios lower than this value. It thus becomes pertinent to consider other ways of detecting the correlation of reflected events between the traces of a seismogram.

The purpose of all the foregoing methods of geophysical interpretation is to discover the depths, at various points, at which similar characteristic signals appear on the record. Knowing said depths, the dip of the lithologic formation which exhibits said characteristic signal can be determined. The computing methods currently in use are inefficient when applied to highly complex data. Expert computers often disagree as to the correct interpretation to be applied to particular data. Often, the data are so complex as to not even be subject to interpretation by expert computers.

It is an object, therefore, of this invention to provide a method and apparatus for the interpretation of geophysical data which is not subject to the inconsistencies of human computers.

It is a further object of this invention to provide a method and apparatus for quickly and easily interpreting geophysical data which are so complex it is impossible for a human computer to interpret said data.

It is a further object of this invention to provide a method and apparatus for separating the useful from the extraneous components present in geophysical data and for providing a quality rating of the data by which the reliability of the interpretation may be determined.

The aforementioned objects are carried out in this invention by the provision of a method and apparatus by which an arbitrarily established criterion is applied to the correlation of a plurality of geophysical data recordings whereby a very large number of interpretations are successively tried until the "best" correlation of all the recordings is obtained thus identifying the interpretation which is most probably the correct one. Examples of criteria applied are the so-called "least square" criterion and the "cross-correlation" criterion.

Briefly described, our method consists of, first, detecting a physical property of the earth at a plurality of spaced points and recording the quantity so detected as a plurality of electrical signals. The quantity may be recorded as a function of depth, as in electrical logging or dipmeter logging, or as a function of time, as in seismic prospecting, with time indicating depth. Portions of the quantity so recorded are transcribed onto a magnetic drum. By means of an electronic circuit, the recordings on the magnetic drum are picked-off and a single electrical signal is produced according to the particular criterion for the degree of closeness of fit chosen. The depth (or time) displacements between the plurality of electrical signals is varied until an extreme value of said single electrical signal indicates the "best fit." The particular displacement which produced the extreme value is then converted and expressed in terms of geological structure.

The invention will be more readily understood from a reading of the attached specification and drawings wherein.

Figure 1:
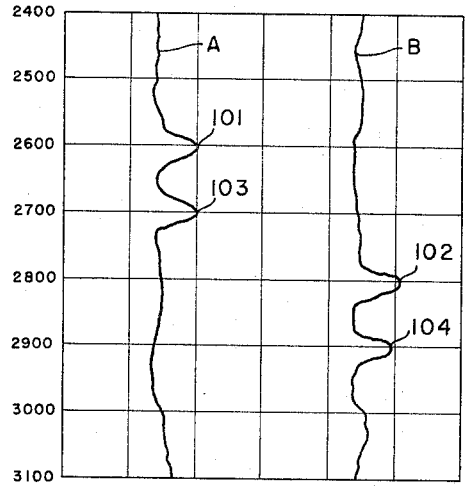
FIG. 1 shows an electrical resistivity log taken at two spaced locations.

As has been pointed out, many geophysical operations involve making physical measurements as a function of some independent variable such as time, or depth. Such measurements are a mixture of information which is geologically significant and variations which are not geologically significant. In practice, such measurements are made at a plurality of locations. A fundamental problem is to separate the significant information (or "message") from the non-significant variations (or "noise"). If there were no significant change in the geological conditions between two locations, the significant part of the measurement, the "message," would not change; any change would thus be solely in the "noise." In general, the differences in the "noise" between the two locations may be expected to vary with the independent variable in a random manner. However, a change in depth of a group of strata produces a systematic shift of the portion of the "message" corresponding to that group of strata without an equivalent systematic shift in the noise. Thus it is possible to make the best estimate of the shift in the geological group of strata, by determining the shift required to give the best fit between the measurements.

It thus appears to be a promising approach to consider the part of the signal which, after certain corrections have been applied, correlates from signal to signal with a determined depth displacement between adjacent signals to be message and to consider the residue to be noise.

For ease of handling, it is advisable to use mathematical expressions for the above. Let:

$\tau$=the depth (time) displacement
$f(t)$=signal
$g(t)$=message
$e(t)$=noise

The expression for the first signal is:

$$f_1(t)=g_1(t)+e_1(t)$$

or $$e_1(t)=f_1(t)-g_1(t) \quad (1)$$

and for the second signal:

$$f_2(t)=g_2(t)+e_2(t) \quad (2)$$

Except for the displacement, $g_1(t)$ and $g_2(t)$ are the same; thus $$g_2(t)=g_1(t+\tau)$$

or $$f_2(t)=g_1(t+\tau)+e_2(t)$$

or $$g_1(t)=f_2(t-\tau)-e_2(t-\tau)$$

or $$e_2(t-\tau)=f_2(t-\tau)-g_1(t) \quad (3)$$

Having arrived at the above expressions, one may next choose a definition of the closeness of fit for matching the messages as they appear in each individual signal. By analogy to the familiar criteria of fitting curves to experimental data by "least squares," one suitable definition of a criterion of the closeness of fit would be based on the squared differences between each signal and the message $g(t)$. The use of the "least squares" method for curve fitting in this case would be to find $\tau$ and a function $g(t)$, of the independent variable, such that the average of the sum of the positive measure of the differences between $g(t)$ and each of the two measurements is a minimum when the second measurement is shifted by $\tau$. When one uses the square as the measure of the error, it can be shown that $g(t)$ is the average of the original measurements with the second shifted by an amount $\tau$.

Hence, the average over an appropriate interval of the sums of the squares of the right-hand members of Equations (1) and (3) can be used as the criterion of closeness of fit. To simplify the explanation of the derivation of the criterion for closeness of fit, it has been assumed only two traces or measurements are to be correlated. However, the formulation can readily be extended to any number of locations or sets of measurements. If $n$ traces are to be correlated the criterion becomes $$\Sigma_n[f_n(t-[n-1]\tau)-g(t)]^2$$

averaged for values of depth (or time) over a desired interval 2T on each signal; it then takes the form $$D(\tau)=\frac{1}{2T}\int_{-T}^{+T}\Sigma_n[f(t-[n-1]\tau)-g(t)]^2 dt$$

where $D(\tau)$ is an indication of the overall "closeness of fit" of all the signals and the smaller $D(\tau)$, the better the fit. It may be seen, therefore, that if it were possible to compare all the traces or sets of measurements for all possible values of $\tau$ and to select the value of $\tau$ yielding the minimum value of $D(\tau)$, the result would be the "best" correlation as defined above.

The above procedure is by no means the only one which can be used to apply the principles of our invention to the interpretation of geophysical data.

Another criterion for the best fit of two curves is based on the so-called "cross-correlation" function. It can be demonstrated mathematically that the "cross-correlation" function is derived from "least squares." Essentially the method of "cross-correlation" consists of multiplying a function of an independent variable, such as depth or time, with a second related function of the same independent variable shifted by an interval $\tau$. If a curve is plotted of the average of the product of the two functions, one function being shifted by an amount $\tau$, for all $\tau$'s, the maximum or minimum point on the curve, depending upon whether the cross products are positive or negative in sign, respectively, represents the value of $\tau$ at which there is optimum correlation. A third criteria for the best fit of two curves is based on the "absolute" difference rather than on the "squared" difference between the curves. When this criterion is used, the "best fit" is achieved when the average of the absolute value of the difference is a minimum.

Figure 2:
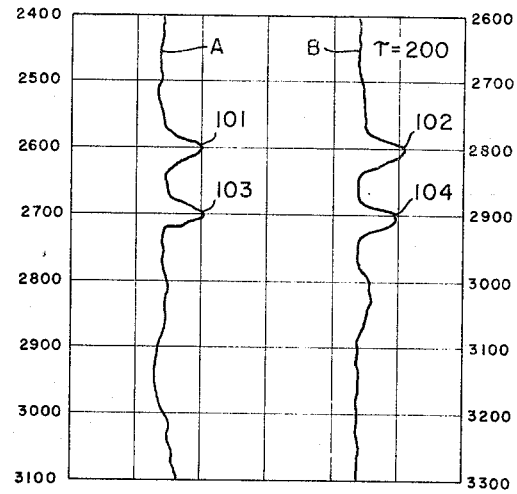
FIG. 2 shows the resistivity logs of FIG. 1, with the log of one location shifted so as to be correlated with the log taken at the second location.
Figure 3:
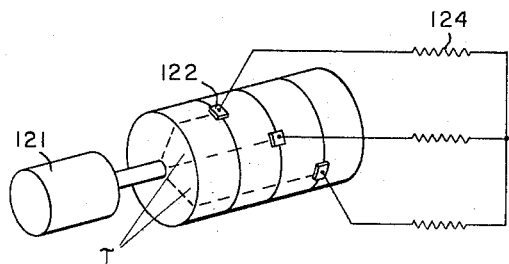
FIG. 3 is a diagram partly schematic and partly in block form representing generally one form of our invention.

In order to trace the application of the aforementioned principles to a detailed method of interpretation consider FIG. 1 which represents what might be termed an ideal electrical log of two spaced apart locations. The points 101 and 102 indicate a characteristic resistivity signal peculiar to a particular type of lithologic stratum. Points 103 and 104 indicate a characteristic signal peculiar to another type of lithologic stratum. FIG. 2 shows the electrical logs after they have been correlated, the shift of log B with respect to A being 200 feet. From a knowledge of the amount of shift required for the "best fit," the depths of a particular stratum at each of the two locations are determined and consequently the amount of dip of said stratum can be ascertained. This procedure can be used to correlate any number of electrical logs. In actual practice, however, the logs obtained are often so complex, because of noise, that the characteristic signal is obscure when the logs are interpreted by a human computer. It is in the correlation of such highly complex signals that our invention has its greatest utility. In order to apply the principles of our invention to this problem it is first necessary to record the signals in some readily reproducible form, preferably in a form which may be used to generate repetitive electrical signals corresponding to the individual traces or to portions of individual traces. A preferred means of doing this would be through the use of magnetic recording. The individual signals may be recorded side by side on a magnetic drum with a suitable record-reproduce magnetic head associated with each track. FIG. 3 shows in schematic fashion how such a recording drum would be used subsequent to the recording of the seismic information thereon. The magnetic drum 120 is driven at constant speed by a motor 121. Arranged around the outer surface of the drum are a plurality of magnetic heads 122 which may be adjusted to occupy different angular positions around the drum as shown. It may be seen, therefore, that each track on the drum will represent one trace of a geophysical data record. Also using well known recording techniques, the electrical signal from these pickup heads, after suitable equalization, will be an equivalent electrical representation of the associated geophysical data trace. As shown in FIG. 3, the several signals over the time interval of interest are added in the potentiometer 123. Isolation resistors 124 are provided to reduce interaction between the channels. As shown in FIG. 3, the sum of the signals, which appears across resistor 123, may be considered the message times N, the number of channels being correlated. By properly positioning the tap 125 of the potentiometer 123, the sum of the signals may be divided by N, leaving the message. This quantity may be recorded so as to produce a permanent record of the message. Actually, however, this quantity represents the message only if the time delay $\tau$ between the recording channels is correctly chosen. Physically in the apparatus shown, this means that the relative angular positions of the various heads must be correct. It is the determination of the correct value of $\tau$ which is the function of the apparatus shown in FIG. 3.

The following steps are followed:

(1) An arbitrary value of $\tau$ is applied by advancing the magnetic heads about the drum.

(2) The signals over the time interval of interest are added electrically. To reduce the amplitude of the sum signal, the tap on potentiometer 123 may be adjusted toward the ground connection of the potentiometer.

(3) The sum signal may be recorded so as to produce a permanent record of the message.

(4) The amplitude variations of the sum signal are emphasized by electrically squaring the sum signal.

(5) The squared signal is electrically averaged over the said interval, and the resulting signal is applied to a suitable visual indicating device, such as a D.C. voltmeter. The indication provided by the D.C. voltmeter would represent $D(\tau)$.

(6) $\tau$ would then be varied over the range of expected values until the value of $\tau$ is found which makes $D(\tau)$ a maximum.

(7) Using this value for the shift of the heads, a permanent recording is made of $g(t)$ which corresponds to the message.

The integral of the squared signal over the interval is proportional to the average of the signal over the interval and thus is indicative of the average of the signal over the interval. Hence, as an alternate to step 5, is desired for any reason, the squared signal is electrically *integrated* over the interval of interest, and the resulting signal is applied to a suitable recording device. The recording would represent $D(\tau)$. When the value of $\tau$ is changed to its next value, it is necessary that the integrator be returned to its zero value so that the integral corresponding to the new value of $\tau$ can be determined.

It should be noted that this procedure yields three kinds of information, first, the message itself, $g(t)$ and, second, $D(\tau)$ which might be considered a quality rating or a measure of the degree of correlation found between the signals, and third, the specific $\tau$ at which $D(\tau)$ is a maximum.

Figure 4:
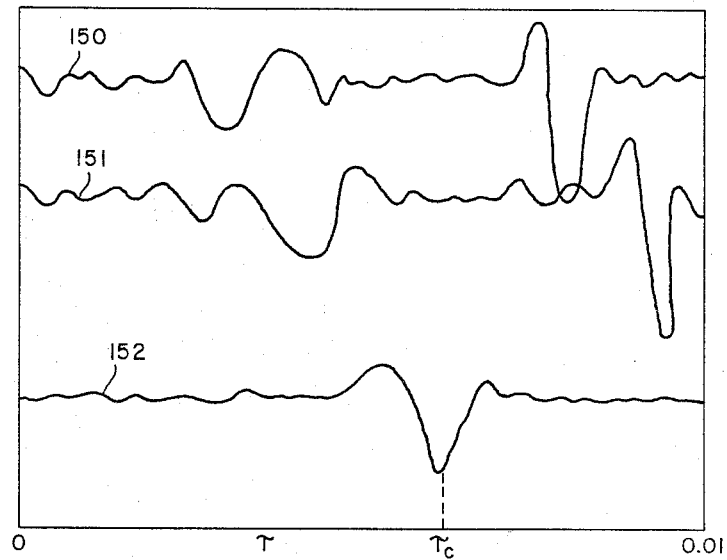
FIG. 4 shows two typical seismic traces and the type of indication which our invention gives of the proper correlation.

FIG. 4 illustrates the results obtained by applying the device of FIG. 3 to the problem of correlating two typical seismic signals. Traces 150 and 151 are the seismic signals used in this example. The curve 152 shows the variation in the value of the cross-correlation function as $\tau$ is varied from zero to 0.01 second. It may be seen that the best fit is obtained at the minimum point on this curve at the value of $\tau$ designated $\tau_c$. It can be shown that the extent to which the message to noise ratio may be improved by the practice of our method is proportional to the number of signals correlated provided that the noise is entirely random. Noise signals having about the same frequency as the desired seismic message and arriving at the detectors from roughly the same direction as the seismic message would not be discriminated against by our system, but only a very small percentage of the noise components encountered in practice meet these specifications and very substantial improvements in message-to-noise ratio can be realized.

Figure 5:
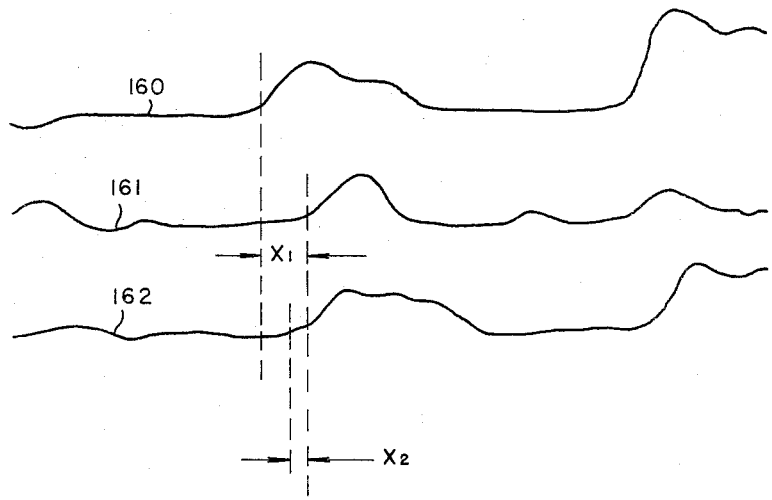
FIG. 5 shows a typical caliper type dipmeter log and the interpretation of this log rendered by a device constructed in accordance with our invention.

A very similar method and apparatus can be used to assist in the interpretation of well logs. Such techniques can be applied to the correlation of well logs made in a number of boreholes located over a particular area. Our method is also very useful in connection with the interpretation of caliper type dipmeter logs of the type described above. FIG. 5 shows a typical dipmeter log with the orientation information omitted for clarity. Traces 160, 161, and 162 represent the profiles of the borehole wall traces by the three caliper arms. The problem in interpreting this log is that of determining the shift of the three traces which results in the best fit between them.

In the case shown, the two displacements are designated as $X_1$ and $X_2$. When these two distances have been established, knowing the dipmeter of the borehole, and the scale factor between distances in the hole and on the traces, it becomes possible to establish the dip angle of the subsurface formations. In cases where the washouts correspond closely on the three traces it is relatively simple to establish the proper displacements by visual inspection. In many holes, however, the correlation between traces is poor and even the most skillful interpreters are unable to fix the displacements with certainty. By using the method disclosed herein such determinations may be made quickly and objectively.

Figure 6:
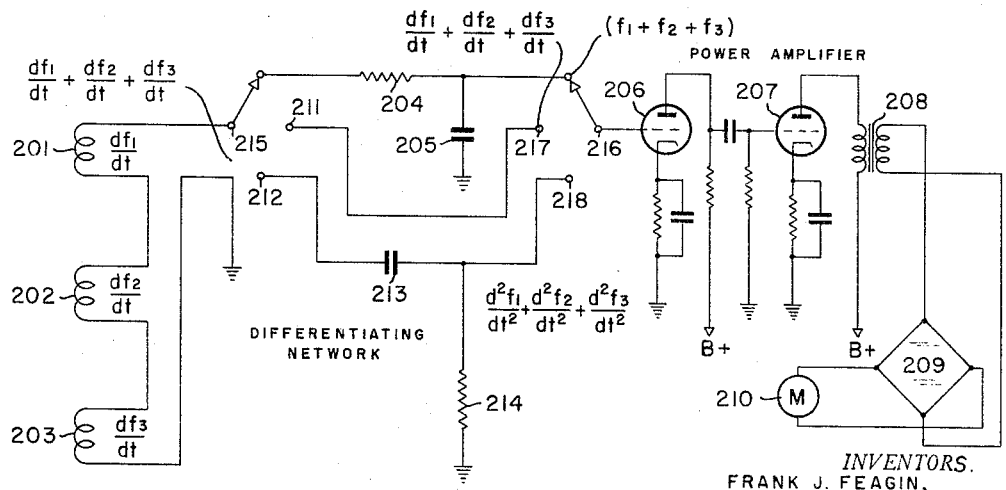
FIG. 6 is a block diagram showing another form of our invention.

For the most part, the particular circuits used in our interpreting device are non-critical and their designs are well within the capabilities of the skilled electronic worker. FIG. 6 shows a schematic circuit diagram for a dipmeter correlator. The circuit shown does not make provision for the recording of the dipmeter record on the magnetic drum. This is a relatively straightforward problem in magnetic recording once the frequency limits and the range of amplitudes have been specified. In general it will be advantageous to first record the dipmeter log on a long strip of magnetic tape and subsequently transcribe portions of the log onto the drum. In this way the correlation of the transcribed data may be carried out at a much higher speed than that used in the original recording of the data. This may be done by rotating the drum faster and designing the circuit for proportionally higher frequencies.

In the circuit of FIG. 6 the three magnetic pickup heads, one associated with the recording of each of the caliper traces, are shown at 201, 202, and 203. Using this particular embodiment of our invention the output of these three heads are added by connecting the units in series. Since the voltage developed by a magnetic pickup head closely approximates the time derivative of the recorded signal, the combined output of the heads is fed to an integrating network formed by a series resistor 204 and a shunt condenser 205. It will be understood by those skilled in the art that this integrating network must present a high impedance to the pickup circuit and that the size of the condenser must be properly chosen in order for the integrating function to be carried out efficiently. After passing through the integrating network the signal, consisting now of the sum of the three recorded signals, is fed to a power amplifier employing two stages consisting of electron tubes 206 and 207. The function of this amplifier is to raise the level of the signal to a point sufficiently high that an adequate driving signal may be supplied to the circuit which follows. The output of the power amplifier is taken from the secondary winding of output transformer 208 and is connected to a thermocouple bridge 209 of the type commonly used in thermal R.F. meters as disclosed at page 329 of the text Electrical Engineering, by L. A. Hazletine, (McMillan, 1924) and at page 927 of the text Radio Engineers Handbook, by F. E. Terman (McGraw-Hill, 1943). The output of the thermocouple bridge is used to drive a conventional D.C. milliammeter 210 on which the output of the circuit may be observed. The thermocouple bridge is well adapted for use in this application since it performs the combined functions of squaring the input signal, and also averaging the squared signal over a period of time determined by the thermal capacity of the bridge network and the meter dynamics. The output applied to the meter represents therefore the average of the square of the sum of the signals of the three recorded caliper traces.

In actual practice it has been found that under certain circumstances it is desirable to leave out the integrating network formed by resistor 204 and condenser 205 in FIG. 6. When this is done the correlation is carried out on the time derivatives of the three recorded signals rather than on the original signals themselves. This may be accomplished in the circuit of FIG. 6 by turning selector switch 215 so that the pointer makes contact with terminal 211 and switch 216 connects through to point 217. In some cases it has been found that sharper correlation curves are obtained than is the case when using the integrating network. It is also possible that conditions may be encountered in which it will be desirable to correlate the second derivative of the recorded signals rather than the first derivatives or the actual signal. This may be done as shown in FIG. 6 by turning selector switches 215 and 216 so as to pass the signal from contact 212 through a differentiating network consisting of condenser 213 and resistor 214 to contact 218. In general, the use of the second or higher derivatives produces an output curve having sharper minima but in some cases it becomes more difficult to determine which minimum point is the correct one.

Though our invention has been described in terms of its usefulness in the interpretation of geophysical data, its utility is not limited to use in interpreting geophysical data. Our invention may be used to correlate any number of curves, regardless of the type of data the curves represent.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letter Patent is:

1. Apparatus for correlating a plurality of data traces recorded in reproducible form on a recording medium, comprising: first means coupled to the recording medium for simultaneously reproducing the data traces as a plurality of electrical signals with adjustable time shifts therebetween; and circuit means coupled to said first means adapted to derive an output signal indicative of the average over a period of time of the amplitude emphasized sum of said electrical signals.

2. Apparatus for correlating a plurality of data traces recorded in reproducible form on a recording medium, comprising: first means coupled to the recording medium for simultaneously reproducing the data traces as a plurality of electrical signals with adjustable time shifts therebetween; and circuit means coupled to said first means adapted to derive an output signal indicative of the average over a period of time of the squared sum of said electrical signals.

3. Apparatus as defined in claim 2 wherein said circuit means comprises a thermocouple bridge having first and second input terminals coupled to the first means, and third and fourth output terminals across which said output signal may appear.

4. Apparatus for correlating a plurality of data traces recorded in reproducible form on a recording medium, comprising: first means coupled to the recording medium for simultaneously reproducing the data traces as a plurality of electrical signals with adjustable time shifts therebetween; first circuit means coupled to said first means for deriving a first signal indicative of the amplitude emphasized sum of said plurality of electrical signals; and averaging circuit means coupled to the output of said first circuit means for averaging said first signal over a period of time.

5. Apparatus for correlating a plurality of traces recorded on a magnetic recording medium, comprising: first means, including a plurality of adjustable magnetic reproducing heads for translating the traces into electrical signals and shifting the time relationship between the electrical signals; circuit means coupled to said first means for deriving a signal indicative of the sum of said electrical signals at any instant; electrical squaring means coupled to said circuit means for squaring said signal indicative of the sum of said electrical signals; and output circuit means for averaging over a period of time the squared output signal of said squaring circuit means to obtain an output signal indicative of correlation between the time shifted electrical signals.

6. The apparatus of claim 5 wherein the output circuit means is an integrating circuit.

7. In combination: a motor; a magnetic drum driven by said motor and having a plurality of traces thereon, a plurality of movable magnetic heads spaced around said magnetic drum for translating said traces into electrical signals and shifting the time relationship between said electrical signals; first circuit means coupled to said magnetic heads for deriving a signal indicative of the sum of said electrical signals at any instant; squaring circuit means for squaring said signal derived by said first circuit means; second circuit means for obtaining an output indication indicative of the average over a period of time of the squared output signal of said squaring circuit means; and electrical indicating means coupled to the output of said second circuit means.

8. The combination of claim 7 wherein said second circuit means is an integrating circuit.

9. In combination: a motor; a magnetic drum rotatable by said motor and having a plurality of traces thereon; a plurality of movable magnetic heads spaced around said magnetic drum for translating said traces into electrical signals and shifting the phase relationship between said electrical signals; first circuit means for adding together said electrical signals to obtain a summed signal, and dividing said summed signal by the number of said electrical signals to derive an output signal; and means for squaring said output signal and for averaging said squared signal over a period of time to obtain an output indication on an electrical meter coupled thereto.

References Cited by the Examiner

UNITED STATES PATENTS

| | | | |
|---|---|---|---|
| 2,099,536 | 11/37 | Scherbatskoy et al. | 180—0.531 |
| 2,394,990 | 2/46 | Eisler et al. | 181—531 |
| 2,628,689 | 2/53 | Reiber | 235—61 |
| 2,638,402 | 5/53 | Lee | 340—15 X |
| 2,927,656 | 3/60 | Feagin et al. | 235—181 X |

MALCOLM A. MORRISON, *Primary Examiner.*

LEO SMILOW, CORNELIUS D. ANGEL, WALTER W. BURNS, Jr., DARYL W. COOK, *Examiners.*